Figure 1:
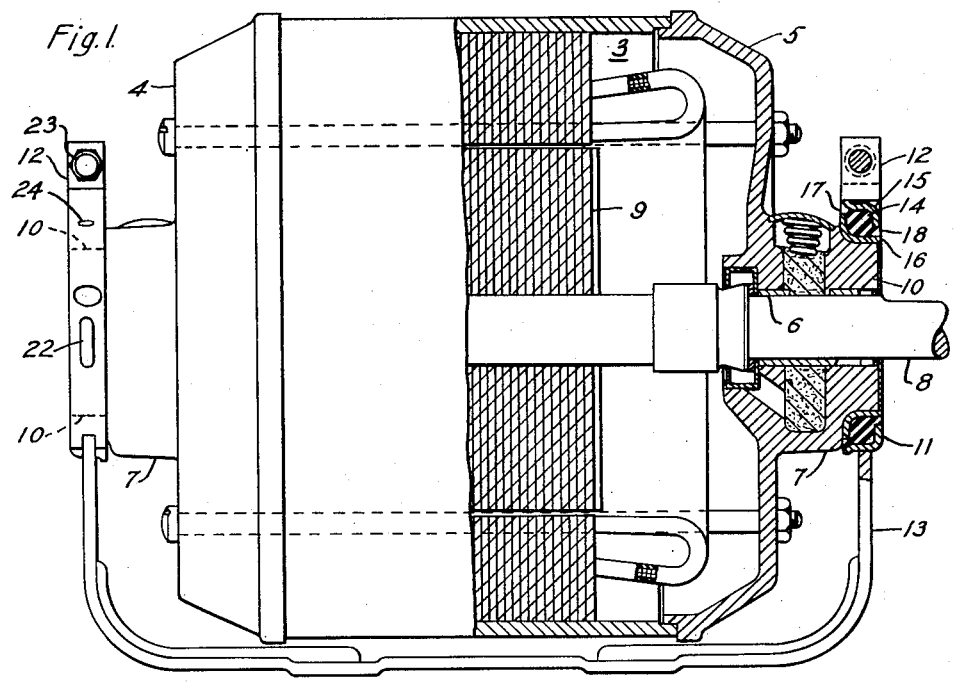

May 5, 1942.  H. D. ELSE ET AL  2,282,174
RESILIENT MOUNTING FOR MOTORS
Filed Dec. 13, 1939

WITNESSES:
H. F. Susser
New C. Groove

INVENTORS
Harry D. Else, and
Cyril G. Veinott.
BY O. B. Buchanan
ATTORNEY

Patented May 5, 1942

2,282,174

UNITED STATES PATENT OFFICE 2,282,174

RESILIENT MOUNTING FOR MOTORS

Harry D. Else and Cyril G. Veinott, Lima, Ohio, assignors to Westinghouse Electric & Manufacturing Company, East Pittsburgh, Pa., a corporation of Pennsylvania Application December 13, 1939, Serial No. 309,000

6 Claims. (Cl. 248—26)

Our invention relates to resilient mounting-ring assemblies such as are utilized for resiliently mounting the two ends of a single-phase electric motor. Such motors produce a torque which has a double-frequency pulsation, or variation in the angular turning moment, varying at the rate of 120 cycles per second, for example, when the motor is energized from a 60-cycle circuit. In order to absorb these pulsations, and prevent the transmission of the same to the stationary supports to which the motor is fastened, it is desirable to permit the motor-frame to oscillate, slightly, about its axis as a center, while transmitting a relatively steady torque-reaction to the stationary support. Such motors are also subject to other displacing-forces tending to establish vibratory movements of the bearings in a radial direction, and also in an axial direction. It is often very desirable to strongly stiffen the motor-support so as to resist distortions in both the radial directions and the axial directions, while causing the support to be relatively yieldable with respect to pulsations in the torques about the shaft or axis of the motor.

Our present invention relates to improvements in a resilient mounting-ring assembly, whereby the mounting will be yieldable with respect to torque-pulsations and stiff with respect to any other displacements of the motor-frame.

A more specific object of our invention is to provide a ring which is made of rubber, or other flowable, yielding solid-material, and enclosing said ring within a two-part, divided housing comprising two angle-sectioned outside-rings of relatively stiff material engaging diagonally opposite corners of said rubber ring, so that the sides of the outside-rings approach close to each other, but, for the most part, said sides are spaced from each other. In this way, the rubber, when subjected to displacements in either the radial or longitudinal direction, cannot flow, in response to the displacing or distorting forces, except between the narrow spaces which are left between the sides of the opposite angle-sectioned rings, and because of the closeness of this restriction, very little flowing, and hence very little yielding, is possible, when either radial or axial displacement-forces are applied to the mounting-ring assembly. On the other hand, when a torsional stress is applied to the ring, tending to cause the inner surface of the rubber ring to rotate circumferentially with respect to the outer surface thereof, the ring is much more yielding, and permits a certain amount of torsional vibration.

Figure 2:
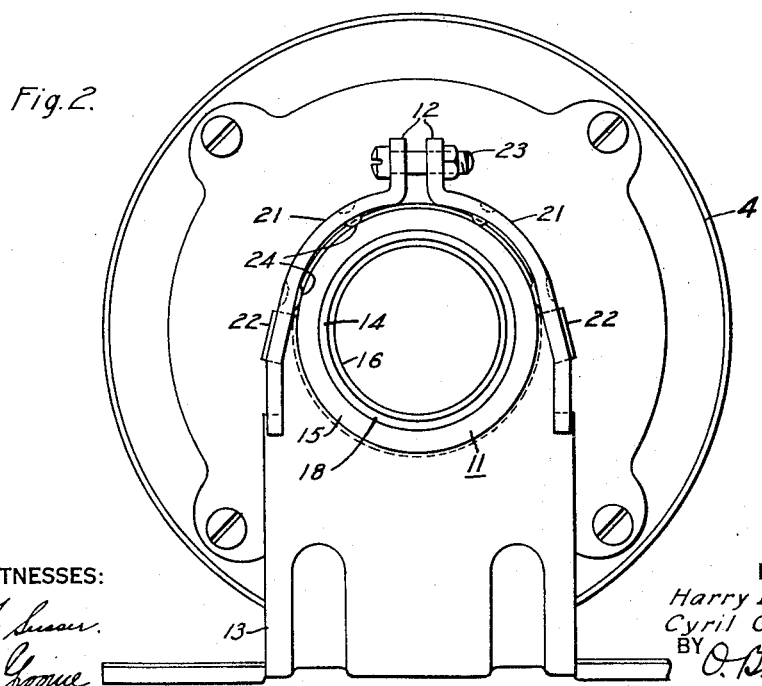

With the foregoing and other objects in view, our invention consists in the elements, combinations, methods and assemblies hereinafter described and claimed, and illustrated in the accompanying drawing, wherein:

Figure 1 is a view, partly in elevation, and partly in vertical section, illustrating a motor embodying our novel mounting-ring assembly; and Fig. 2 is an end view thereof.

In Figure 1, we show our invention as applied to a single-phase motor comprising a stator member 3 having end-brackets 4 and 5 carrying bearings 6 and bearing-housings 7 for supporting a shaft 8 which carries the rotor-member 9 of the motor. Each of the bearing-housings 7 is provided with an axially entending end-nose or protuberance 10 which in encircled by our novel resilient mounting-ring assembly 11, which is, in turn, encircled by a clamping-means 12 which is carried by a supporting cradle 13.

Our novel resilient mounting-ring assembly comprises an inner ring 14 of rubber or other flowable, yielding solid-material, which is confined within a two-part, divided housing comprising an inner angle-sectioned outside-ring 15, (referring to a ring outside of the rubber ring 14), and an outer angle-sectioned outside-ring 16, these two rings engaging diagonally opposite corners of the rubber inside-ring 14. The sides of the angle-sectioned outside-rings approach close to each other, but are, for the most part, spaced from each other, as indicated at 17 and 18, so that, if the rubber is subjected to compression, in either an axial direction or a radial direction, it can flow only slightly, in response to the compressional forces, because it can expand only through the aforesaid restricted openings 17 and 18 between the sides of the two angle-sectioned outer-rings 15 and 16. These angle-sectioned outer-rings 15 and 16 are made of light sheet-metal, or other suitable, relatively stiff material.

In the particular form of embodiment of our invention which is illustrated in the drawing, the clamping-means 12 comprises two clamping-straps 21, which are hooked over lugs 22 which are provided at the ends of the cradle-arms 13, the straps 21 being drawn together by means of a bolt 23, and being provided with inwardly projecting bosses 24 which press into the thin metal outside-rings 15 and 16 of the mounting-ring assembly, deforming the same in order to prevent slippage of the clamping-arms 21.

In operation, it will be noted that we have taken advantage of the fact that rubber, while yieldable, is a relatively non-compressible material.

In other words, when it yields in one direction, it must expand or flow or move in some other direction so that it occupies about the same volume. When a force is applied tending to twist the rubber ring 14 torsionally, that is, to rotate the inside outer-ring 15 through a small arc, while holding the outside outer-ring 16 stationary, for example, the rubber ring 14 will be relatively free to yield in this manner, because one portion of the rubber can flow in one circumferential direction, while the other portion of the rubber flows, relatively speaking, in the other circumferential direction. When a resilient mounting-ring assembly such as we have devised is subjected, however, to displacement-forces in any direction other than torsional displacement-forces, there is relatively only a small place or way in which the rubber can flow, in order to yield at all. Thus, if an effort is made to compress the rubber, as a result of either a radially directed force or an axially directed force, the rubber can flow only by oozing out of the restricted spaces 17 and 18, and these restricted spaces are so small that the rubber cannot readily become displaced in these directions.

We have thus provided a resilient ring-mounting which is particularly adapted for those motor-applications in which it is important to practically prevent all movements of the motor-frame except the torsional oscillations, about the axis, which are necessary to prevent the transmission of a pulsating torque to the supporting structure. The particular application, for which our invention was primarily designed, is in connection with motors for domestic stoker-applications requiring a belt-drive and also a fan mounted directly on the motor-shaft. Motors of this type have heretofore presented a particularly difficult mounting-problem, because of difficulties due to noise and vibration, and while our invention is obviously not altogether limited to such applications, it will be perceived that it is particularly well adapted for these applications, where it is obviously necessary to resist the end-thrust of the fans, to prevent torsional vibration of the fan-blades, and to prevent lateral distortion due to the pull of the belt, particularly the vibration caused by joints in the belt.

While we have illustrated our invention in a preferred form of embodiment, we desire it to be understood that we are not limited to any particular form, as various changes may be made by those skilled in the art, without departing from the essential spirit of our invention. We desire, therefore, that the appended claims shall be accorded the broadest construction consistent with their language and the prior art.

We claim as our invention:

1. In combination, a member subject to torsional vibration about an axis, and a support therefor comprising a resilient mounting-ring assembly concentric with said axis and comprising an inside-ring of a flowable, yielding solid-material, and a two-part, divided housing comprising two angle-sectional outside-rings of relatively stiff material engaging diagonally opposite corners of said inside-ring, the sides of said outside-rings approaching close to, but for the most part spaced from, each other by a space too small for a substantial amount of flowing of the yieldable solid-material therethrough, whereby the mounting-ring assembly is relatively rigid in all directions except torsional.

2. In combination, a supported body having a laterally extending supporting-protuberance thereon, a resilient mounting-ring assembly surrounding said supporting-protuberance, and a support having a clamping-member surrounding said mounting-ring assembly, characterized by said resilient mounting-ring assembly comprising an inside-ring of a flowable, yielding solid-material, and a two-part, divided housing comprising two angle-sectioned outside-rings of relatively stiff material engaging diagonally opposite corners of said inside-ring, the sides of said outside-rings approaching close to, but for the most part spaced from, each other, by a space too small for a substantial amount of flowing of the yieldable solid-material therethrough, whereby the mounting-ring assembly is relatively rigid in all directions except torsional.

3. A pulsating-torque, rotating shaft, prime-mover having a stator-member provided with a bearing surrounding said shaft, and resilient supporting-means for so supporting said bearing as to be relatively flexible with respect to torsional vibrations but relatively stiff with respect to both lateral and axial vibrations of said bearing, said resilient supporting-means comprising a resilient mounting-ring assembly surrounding said bearing, and a support having a clamping-member surrounding said mounting-ring assembly, characterized by said resilient mounting-ring assembly comprising an inside-ring of a flowable, yieldable solid-material, and a two-part, divided housing comprising two angle-sectioned outside-rings of relatively stiff material engaging diagonally opposite corners of said inside-ring, the sides of said outside-rings approaching close to, but for the most part spaced from, each other, by a space too small for a substantial amount of flowing of the yieldable solid-material therethrough, whereby the mounting-ring assembly is relatively rigid in all directions except torsional.

4. In combination, a member subject to torsional vibration about an axis, and a support therefor comprising a resilient mounting-ring assembly concentric with said axis and comprising an inside-ring of a flowable, yielding solid-material, and a two-part, divided housing comprising two outside-rings of relatively stiff material, one of said outside-rings being within, and the other outside of, said inside-ring, the two parts of said divided housing comprising wall-sections approaching close to, but for the most part spaced from, each other by a space too small for a substantial amount of flowing of said inside-ring therethrough, whereby the mounting-ring assembly is relatively rigid in all directions except torsional.

5. In combination, a supported body having a laterally extending supporting-protuberance thereon, a resilient mounting-ring assembly surrounding said supporting-protuberance, and a support having a clamping-member surrounding said mounting-ring assembly, characterized by said resilient mounting-ring assembly comprising an inside-ring of a flowable, yielding solid-material, and a two-part, divided housing comprising two outside-rings of relatively stiff material, one of said outside-rings being within, and the other outside of, said inside-ring, the two parts of said divided housing comprising wall-sections approaching close to, but for the most part spaced from, each other by a space too small for a substantial amount of flowing of said inside-ring therethrough, whereby the mounting-ring assembly is relatively rigid in all directions except torsional.

6. A pulsating-torque, rotating shaft, prime-mover having a stator-member provided with a bearing surrounding said shaft, and resilient supporting-means for so supporting said bearing as to be relatively flexible with respect to torsional vibrations but relatively stiff with respect to both lateral and axial vibrations of said bearing, said resilient supporting-means comprising a resilient mounting-ring assembly surrounding said bearing, and a support having a clamping-member surrounding said mounting-ring assembly, characterized by said resilient mounting-ring assembly comprising an inside-ring of a flowable, yielding solid-material, and a two-part, divided housing comprising two outside-rings of relatively stiff material, one of said outside-rings being within, and the other outside of, said inside-ring, the two parts of said divided housing comprising wall-sections approaching close to, but for the most part spaced from, each other by a space too small for a substantial amount of flowing of said inside-ring therethrough, whereby the mounting-ring assembly is relatively rigid in all directions except torsional.

HARRY D. ELSE.
CYRIL G. VEINOTT.